(12) United States Patent
Shamash et al.

(10) Patent No.: US 10,782,200 B2
(45) Date of Patent: Sep. 22, 2020

(54) APPARATUS AND METHOD FOR THERMAL INSULATION OF HIGH-TEMPERATURE PRESSURE SENSORS

(71) Applicant: MKS Instruments, Inc., Andover, MA (US)

(72) Inventors: Orry Shamash, Andover, MA (US); Alan Ludwiszewski, Andover, MA (US); Clinton Percy, Andover, MA (US); Boris Mandadzhiev, Andover, MA (US)

(73) Assignee: MKS Instruments, Inc., Andover, MA (US)

(*) Notice: Subject to any disclaimer, the term of this patent is extended or adjusted under 35 U.S.C. 154(b) by 202 days.

(21) Appl. No.: 16/019,832

(22) Filed: Jun. 27, 2018

(65) Prior Publication Data
US 2020/0003650 A1    Jan. 2, 2020

(51) Int. Cl.
*G01L 19/06* (2006.01)
*G01L 19/14* (2006.01)
*C04B 111/28* (2006.01)

(52) U.S. Cl.
CPC .......... *G01L 19/0681* (2013.01); *G01L 19/14* (2013.01); *C04B 2111/28* (2013.01)

(58) Field of Classification Search
CPC ... G01L 19/147; G01L 9/0042; G01L 9/0054; G01L 9/0072; G01L 13/025; G01L 19/04; G01L 19/14; G01L 19/0038; G01L 19/0084; G01L 9/0075; G01L 19/0069; G01L 19/0618; G01L 9/0055; G01L 9/0073; G01L 19/0092; G01L 19/0645; G01L 19/143; G01L 9/0051; G01L 9/0052; G01L 19/0007; G01L 19/0046;
(Continued)

(56) References Cited

U.S. PATENT DOCUMENTS 5,046,365 A * 9/1991 Kumley .................. G01D 3/08
                                                               361/700
5,625,152 A * 4/1997 Pandorf ................ G01L 9/0072
                                                                 73/756
(Continued)

FOREIGN PATENT DOCUMENTS

| KR | 1020150034319 A | 4/2015 |
|---|---|---|
| WO | 0018225 A1 | 4/2000 |

OTHER PUBLICATIONS

International Search Report Issued in PCT/US2019/038168 dated Oct. 4, 2019.

*Primary Examiner* — Andre J Allen
(74) *Attorney, Agent, or Firm* — Burns & Levinson, LLP; Joseph M. Maraia; Steven M. Mills (57) ABSTRACT

A high-temperature pressure sensor includes a pressure sensor device and a heater shell body external to the pressure sensor device for providing heat to the pressure sensor device. A particle-generating insulation material is encapsulated within an encapsulation material to form an encapsulated insulation structure comprising the particle-generating insulation material within the encapsulation material, such that the encapsulation material substantially contains particles generated by the particle-generating insulation material within encapsulated insulation structure. The encapsulated insulation structure is disposed adjacent to an exterior of the heater shell body.

49 Claims, 11 Drawing Sheets

(58) Field of Classification Search
CPC . G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/16; G01L 7/00; G01L 7/163; G01L 7/166; G01L 9/0047; G01L 9/12; G01L 11/02; G01L 13/00; G01L 15/00; G01L 19/003; G01L 19/0609; G01L 19/083; G01L 19/10; G01L 19/145; G01L 19/148; G01L 27/005; G01L 7/08; G01L 7/082; G01L 9/0045; G01L 9/0048; G01L 9/006; G01L 9/007; G01L 9/0076; G01L 9/04; G01L 9/045; G01L 9/06; G01L 9/065; G01L 9/125; G01L 11/00; G01L 17/00; G01L 19/00; G01L 19/0015; G01L 19/0076; G01L 19/02; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................................. 73/700–756
See application file for complete search history.

(56) References Cited

U.S. PATENT DOCUMENTS

| | | | |
|---|---|---|---|
| 5,808,206 A | 9/1998 | Pandorf | |
| 6,510,740 B1* | 1/2003 | Behm | G01D 1/00 73/708 |
| 6,883,380 B2 | 4/2005 | Romo | |
| 7,000,479 B1* | 2/2006 | Poulin | G01L 19/04 73/708 |
| 7,124,640 B1* | 10/2006 | Miller | G01L 19/04 73/708 |
| 2006/0070447 A1* | 4/2006 | Agami | G01L 19/04 73/708 |
| 2006/0283255 A1* | 12/2006 | Tilak | G01H 9/00 73/705 |
| 2010/0155866 A1* | 6/2010 | Guo | C23C 14/021 257/419 |
| 2017/0205303 A1* | 7/2017 | Sanden | G01L 13/06 |

* cited by examiner

APPARATUS AND METHOD FOR THERMAL INSULATION OF HIGH-TEMPERATURE PRESSURE SENSORS

BACKGROUND

1. Technical Field

The present disclosure is related to thermal insulation structures and methods and, more particularly, to thermal insulation structures and methods for insulating high-temperature pressure sensors.

2. Discussion of Related Art

High-temperature pressure sensors typically use insulation to isolate the elevated temperature areas from the ambient environment. Advanced insulations, for example, aerogels, microporous silica, and pyrogenic (fumed) silica provide excellent isolation with minimal volume requirements, and are therefore suitable materials for use in such sensors. A drawback to these materials is that they release particles when impacted or flexed. Many applications for high-temperature sensors and other high-temperature equipment requiring insulation, such as, for example, semiconductor processing applications, are contaminant-sensitive, making these particle-shedding advanced insulations incompatible or less desirable for these applications.

SUMMARY

According to a first aspect, high-temperature pressure sensor is provided. The high-temperature pressure sensor includes a pressure sensor device and a heater shell body external to the pressure sensor device for providing heat to the pressure sensor device. A particle-generating insulation material is encapsulated within an encapsulation material to form an encapsulated insulation structure comprising the particle-generating insulation material within the encapsulation material, such that the encapsulation material substantially contains particles generated by the particle-generating insulation material within encapsulated insulation structure. The encapsulated insulation structure is disposed adjacent to an exterior of the heater shell body.

In some exemplary embodiments, the particle-generating insulation material comprises one of aerogel material, microporous silica, and pyrogenic (fumed) silica. The encapsulation material can comprise at least one of a fluoropolymer material and a thermoplastic material. The thermoplastic material can be a thermoplastic film. The thermoplastic material can include at least one material selected from polytetrafluoroethylene (PTFE), perfluoroalkoxy (PFA), ethylene tetrafluoroethylene (ETFE), polyfluoroethylenepropylene (FEP), tetrafluoroethylene/hexafluoropropylene/vinylidene fluoride (THV), polyvinylidene fluoride (PVDF), ethylenechlorotrifluoroethylene (ECTFE), polyether ether ketone (PEEK), polyimide (PI) and polyethylenimine (PEI). The thermoplastic material can have a thickness in the range of 0.0005 to 0.0500 inch.

In some exemplary embodiments, the encapsulation material can include a metallized film. The encapsulation material can be in sheet form, vacuum-molded form, pressure-molded form, matched die molded form, or blow-molded form. In some exemplary embodiments, the encapsulation material comprises a heat seal, a laser weld, an adhesive bond, or a tape seal for sealing the particle-generating insulation material within the encapsulation material.

In some exemplary embodiments, the encapsulation material comprises a seal such that the particle-generating insulation material is sealed within the encapsulation material, and an interior of the encapsulation material is at least partially evacuated. The encapsulation material can comprise a one-way valve for facilitating at least partial evacuation of the interior of the encapsulation material. The one-way valve can be adapted to facilitate the at least partial evacuation of the interior of the encapsulation material by vacuum pumping. The one-way valve can be adapted to facilitate the at least partial evacuation of the interior of the encapsulation material by heating of the porous insulation material and adjacent gas.

In some exemplary embodiments, the encapsulation material comprises a porous region allowing gas migration in and out of an interior of the encapsulation material, the porous region having openings having a size selected to contain particles generated by the particle-generating insulation within the encapsulation material. The porous region can include a porous membrane and/or one or more laser-drilled holes.

According to another aspect, a method of making a high-temperature pressure sensor is provided. According to the method, a heater shell body is disposed external to a pressure sensor device for providing heat to the pressure sensor device. A particle-generating insulation material is encapsulated within an encapsulation material to form an encapsulated insulation structure comprising the particle-generating insulation material within the encapsulation material, such that the encapsulation material substantially contains particles generated by the particle-generating insulation material within encapsulated insulation structure. The encapsulated insulation structure is disposed adjacent to an exterior of the heater shell body.

The method of claim 25, wherein the particle-generating insulation material comprises one of aerogel material, microporous silica, and pyrogenic (fumed) silica.

In some exemplary embodiments, the particle-generating insulation material comprises one of aerogel material, microporous silica, and pyrogenic (fumed) silica. The encapsulation material can comprise at least one of a fluoropolymer material and a thermoplastic material. The thermoplastic material can be a thermoplastic film. The thermoplastic material can include at least one material selected from polytetrafluoroethylene (PTFE), perfluoroalkoxy (PFA), ethylene tetrafluoroethylene (ETFE), polyfluoroethylenepropylene (FEP), tetrafluoroethylene/hexafluoropropylene/vinylidene fluoride (THV), polyvinylidene fluoride (PVDF), ethylenechlorotrifluoroethylene (ECTFE), polyether ether ketone (PEEK), polyimide (PI) and polyethylenimine (PEI). The thermoplastic material can have a thickness in the range of 0.0005 to 0.0500 inch.

In some exemplary embodiments, the encapsulation material can include a metallized film. The encapsulation material can be in sheet form, vacuum-molded form, pressure-molded form, matched die molded form, or blow-molded form. In some exemplary embodiments, the encapsulation material can be heat sealed, laser welded, adhesively bonded or tape-sealed to seal the porous insulation material within the encapsulation material.

In some exemplary embodiments, the particle-generating insulation material can be sealed within the encapsulation material; and the interior of the encapsulation material can be at least partially evacuated. The encapsulation material can comprise a one-way valve for facilitating at least partial evacuation of the interior of the encapsulation material. The one-way valve can be adapted to facilitate the at least partial evacuation of the interior of the encapsulation material by vacuum pumping. The one-way valve can be adapted to facilitate the at least partial evacuation of the interior of the encapsulation material by heating of the porous insulation material and adjacent gas.

In some exemplary embodiments, a porous region is formed in the encapsulation material to allow gas migration in and out of an interior of the encapsulation material, the porous region having openings having a size selected to contain particles generated by the particle-generating insulation within the encapsulation material. Forming the porous region in the encapsulation material can include forming the encapsulation material with a porous membrane. Forming the porous region in the encapsulation material can include laser-drilling a plurality of holes in the encapsulation material.

In some exemplary embodiments, an opening is formed in the encapsulation material to allow gas migration in and out of an interior of the encapsulation material.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

A benefit of advanced thermal insulations, for example, aerogels, microporous silica, and pyrogenic (fumed) silica, such as, for example, Promalight® thermal insulation, manufactured and sold by Promat, Inc., in Maryville, Tenn. USA, is that they provide high insulation value with minimal thickness. Within a given package volume, this reduces external housing temperature and allows use of lower-rated housing materials, reduces heater power consumption and printed circuit board assembly (PCBA) temperature, and improves sensor temperature uniformity. Encapsulating the insulation materials in a traditional package, for example, an injection molded housing, fills part of the available volume with a poorer insulating material, e.g., plastic, thus reducing the overall insulation efficiency. Also, this encapsulating material can act as a thermal path, effectively short-circuiting the insulation. Many possible encapsulation materials also degrade at high temperature, particularly over 150° C.

Coating materials, including ceramics and silicones, have been used to address the particle-shedding issue, but with limited success. The insulation materials frequently have weak structural integrity, so any stress on the coatings, such as from differential thermal expansion during thermal cycling, can cause the coated surface to separate from the remainder of the insulation, resulting in cracking and peeling of the coatings.

According to the present disclosure, thin, high-temperature materials, in conjunction with standard forming techniques, are used to create a space-efficient encapsulation for these advanced insulation materials. The thin, high-temperature materials can be fluoropolymer and/or thermoplastic films, comprising materials such as polytetrafluoroethylene (PTFE), perfluoroalkoxy (PFA), ethylene tetrafluoroethylene (ETFE), polyfluoroethylenepropylene (FEP), tetrafluoroethylene/hexafluoropropylene/vinylidene fluoride (THV), polyvinylidene fluoride (PVDF), ethylenechlorotrifluoroethylene (ECTFE), polyether ether ketone (PEEK), polyimide (PI), polyethylenimine (PEI), or other such materials. In some exemplary embodiments, the encapsulation film can have a thickness in the range of 0.0005 to 0.0500 inch.

According to some exemplary embodiments, these encapsulating high-temperature films may be used in sheet form, or may be thermoformed, such as by vacuum molding or blow molding, to create a shape for the film appropriate for the particular application. The sheets can then be heat sealed or laser welded, using only the film material or in conjunction with an additional material to aid in the sealing, adhesive bonded, or tape sealed. These configurations of the exemplary embodiments allow the encapsulated insulation to operate continually at over 260° C. In some exemplary embodiments, the encapsulating films may be applied to the insulation such that seams are located on the lower-temperature side of the insulation, allowing a greater selection of sealing options.

Another issue in connection with encapsulation of high-temperature insulation for particulate contamination control is that gas trapped in the encapsulation will expand when heated. If the encapsulation is well sealed to prevent particulate loss, the expanding gas, e.g., air, will be trapped, causing the encapsulation to balloon and/or possibly rupture. According to some exemplary embodiments, this can be addressed by evacuating the gas from the insulation and encapsulated volume prior to sealing, by incorporating a porous membrane that will allow gas migration in and out of the encapsulated volume without particle loss, creating areas of porosity in the encapsulating film, such as through laser drilling, or creating a one-way valve structure in the encapsulation and evacuating a sufficient volume of gas post-seal, either through vacuum pumping or heating of the encapsulated insulation.

Figure 1A:
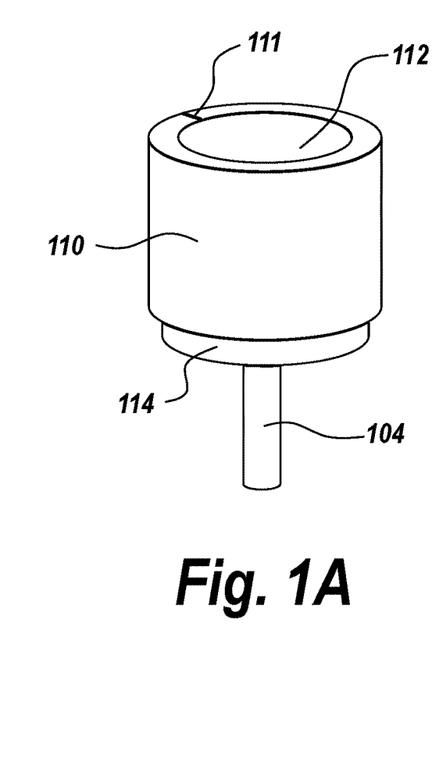
FIG. 1A includes a schematic perspective view of a high-temperature pressure sensor with thermal insulation, according to some exemplary embodiments.
Figure 1B:
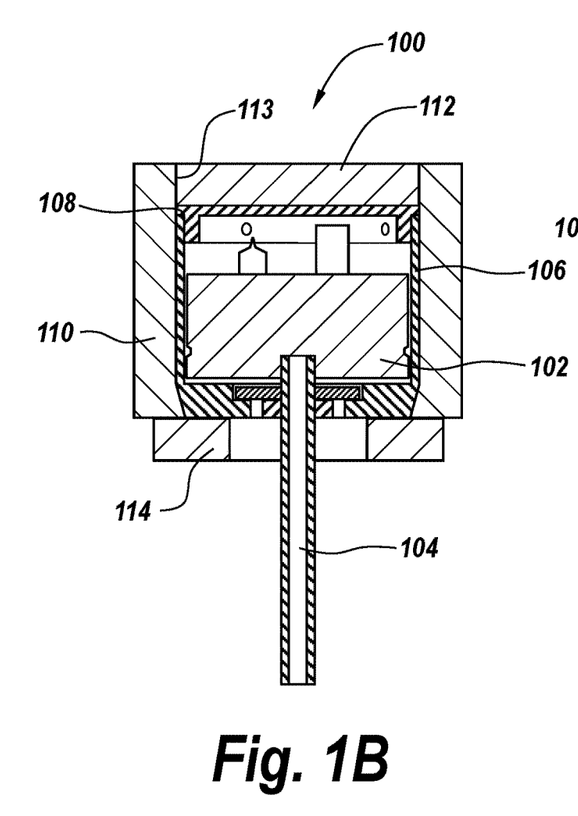
FIG. 1B includes a schematic cross-sectional view of the high-temperature pressure sensor of FIG. 1A, according to some exemplary embodiments.
Figure 1C:
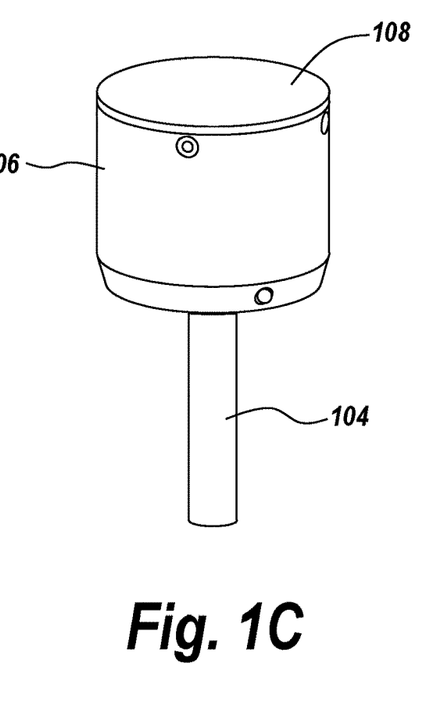
FIG. 1C includes a schematic perspective view of a heater shell body in the high-temperature pressure sensor of FIG. 1A, according to some exemplary embodiments.

FIG. 1A includes a schematic perspective view of a high-temperature pressure sensor with thermal insulation, according to some exemplary embodiments. FIG. 1B includes a schematic cross-sectional view of the high-temperature pressure sensor of FIG. 1A, according to some exemplary embodiments. FIG. 1C includes a schematic perspective view of a heater shell body in the high-temperature pressure sensor of FIG. 1A, according to some exemplary embodiments.

Referring to FIGS. 1A-1C, high-temperature pressure sensor 100 includes a pressure sensor device 102 at least partially surrounded by a heater shell body 106 for providing heat to pressure sensor device 102. Inlet tube 104 couples sensor 100 to a space, the pressure of which is being sensed (not shown). Heater shell top 108 is affixed to the top of heater shell body 106. Under normal operating conditions heater shell body 106 and heater shell top 108 can heat sensor device 102 to temperatures as high as 250° C. or higher. To mitigate the effects of this heating, heater shell body 106 and heater shell top 108 are thermally insulated, according to the present disclosure.

In the exemplary embodiments illustrated in FIGS. 1A-1C, the thermal insulation includes an encapsulated thermal insulation structure 110, which can take the form of one of the high-performance materials described above, i.e., aerogels, microporous silica, and pyrogenic (fumed) silica, encapsulated as described above in a thin, high-temperature material, e.g., a fluoropolymer and/or thermoplastic film, comprising one or more of the following materials: polytetrafluoroethylene (PTFE), perfluoroalkoxy (PFA), ethylene tetrafluoroethylene (ETFE), polyfluoroethylenepropylene (FEP), tetrafluoroethylene/hexafluoropropylene/vinylidene fluoride (THV), polyvinylidene fluoride (PVDF), ethylenechlorotrifluoroethylene (ECTFE), polyether ether ketone (PEEK), polyimide (PI), polyethylenimine (PEI), or other such materials. In some alternative exemplary embodiments, the encapsulating material can comprise a metallized film. In some exemplary embodiments, the encapsulation film can have a thickness in the range of 0.0005 to 0.0500 inch.

In some exemplary embodiments, encapsulated insulation structure 110 is flexible and is wrapped around the exterior of heater shell body 106 and heater shell top 108, leaving a junction or seam 111 where the two ends of structure 110 come together. Seam 111 can be sealed and held in place by a material, such as adhesive polyimide film, or other such material.

In some exemplary embodiments, encapsulated insulation structure 110, when wrapped around the exterior of heater shell body 106 and heater shell top 108, leaves a recess or counter bore 113 along the inside surface of encapsulated insulation structure 110. A top encapsulated insulation disk structure 112, can be inserted into recess 113 and can be sealed to the top of encapsulated insulation structure 110 and held in place by an insulating material, such as adhesive polyimide film, or other such material. Similarly, a bottom encapsulated insulation disk structure 114 can be sealed to the bottom of encapsulated insulation structure 110 and held in place by a material, such as adhesive polyimide film, or other such material, or the outer enclosure of sensor 100 (not shown).

Figure 2A:
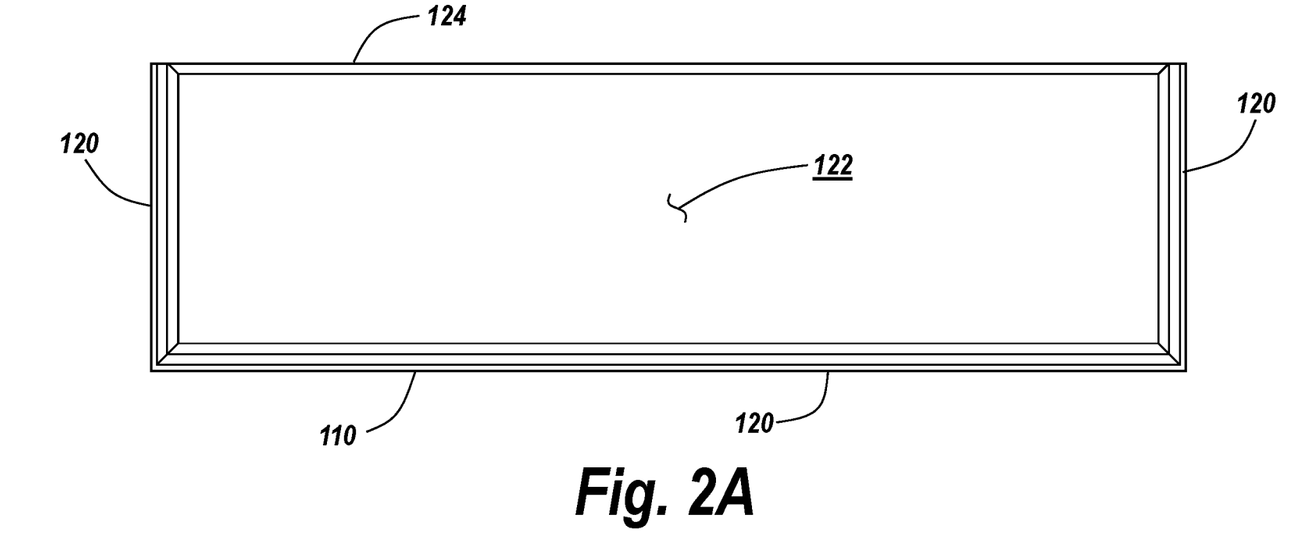
FIG. 2A includes a schematic top view of an encapsulated insulation structure in the high-temperature pressure sensor of FIGS. 1A-1C, according to some exemplary embodiments.
Figure 2B:
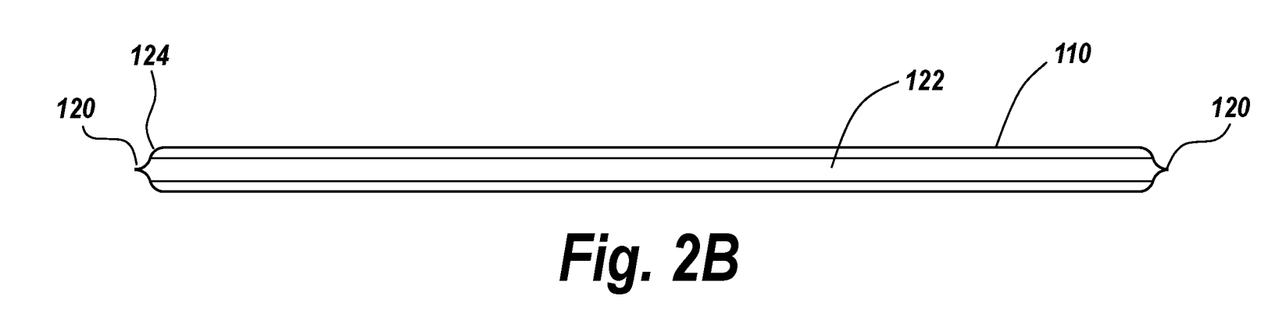
FIG. 2B includes a schematic side view of the encapsulated insulation structure of FIG. 2A, according to some exemplary embodiments.

FIG. 2A includes a schematic top view of an encapsulated insulation structure 110 in the high-temperature pressure sensor 100 of FIGS. 1A-1C, according to some exemplary embodiments. FIG. 2B includes a schematic side view of encapsulated insulation structure 110 of FIG. 2A, according to some exemplary embodiments. Referring to FIGS. 2A and 2B, encapsulated insulation structure 110 takes the form of a flexible insulation "blanket" which can be wrapped around sensor 100 as described above. To that end, the high-performance insulation material 122 can be an aerogel blanket insulation, e.g., Pyrogel® XTE blanket insulation, such as that manufactured and sold by Aspen Aerogels, Inc., Northborough, Mass. USA.

In some exemplary embodiments, high-performance insulation material 122 is sealed within a sealed "baggie" or "pouch" made from an encapsulation element 124, which in the illustrated embodiment is a PTFE film 124, which is sealed at a seal 120 around its edges. PTFE film 124 includes two sheets sealed together at seal 120.

Figure 3:
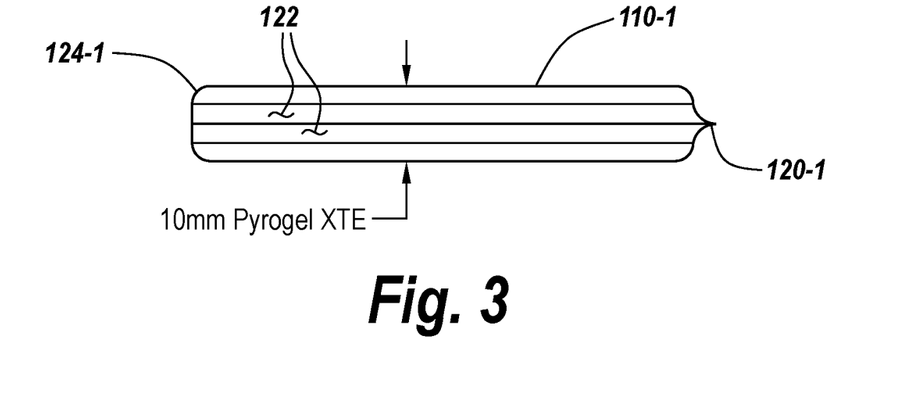
FIG. 3 includes a schematic end view of an embodiment of the encapsulated insulation structure of FIGS. 2A and 2B, according to some exemplary embodiments.

FIG. 3 includes a schematic side view of an alternative embodiment of the encapsulated insulation structure 100 of FIGS. 2A and 2B, according to some exemplary embodiments. Referring to FIG. 3, in encapsulated insulation structure 110-1, instead of a pair of sheets of PTFE sealed around the entire edge 120 of high-performance insulation material 122, the "baggie" or "pouch" of encapsulated insulation structure 110-1 includes a single sheet of PTFE film 124-1 folded to form a pocket with a single open edge 120-1, which is sealed after high-performance insulation material 122 is inserted inside the pocket.

Figure 4A:
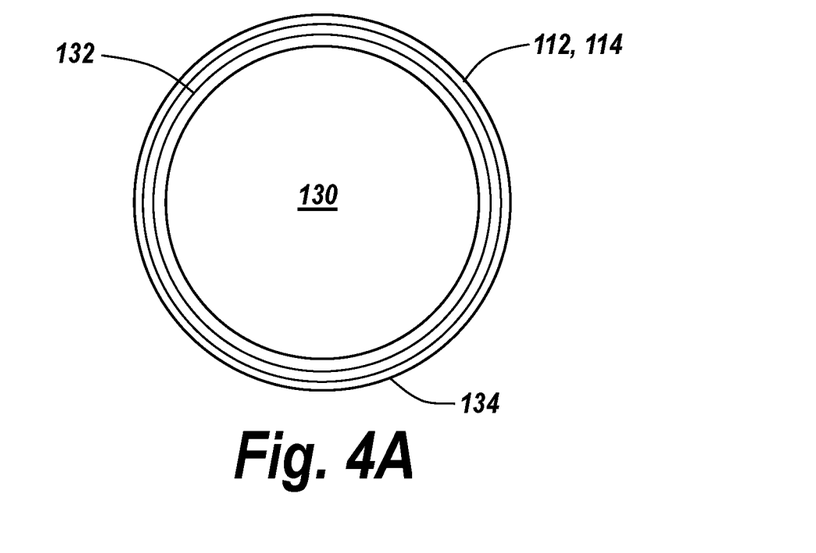
FIG. 4A includes a schematic top view of an encapsulated insulation disk structure in the high-temperature pressure sensor of FIGS. 1A-1C, according to some exemplary embodiments.
Figure 4B:
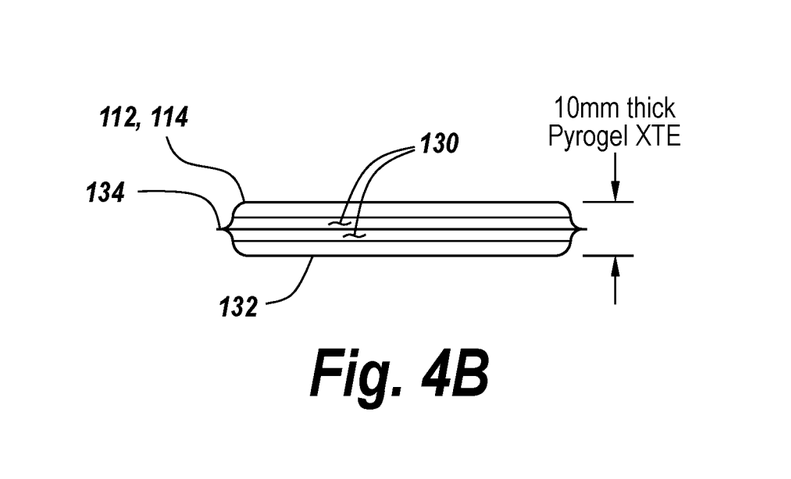
FIG. 4B includes a schematic side view of the encapsulated insulation disk structure of FIG. 4A, according to some exemplary embodiments.

FIG. 4A includes a schematic top view of an encapsulated insulation disk structure 112, 114 in high-temperature pressure sensor 100 of FIGS. 1A-1C, according to some exemplary embodiments. FIG. 4B includes a schematic side view of encapsulated insulation disk structure 112, 144 of FIG. 4A, according to some exemplary embodiments. Referring to FIGS. 4A and 4B, encapsulated insulation disk structure 112, 114 includes high-performance insulation material 130, which can be an aerogel blanket insulation, e.g., Pyrogel® XTE blanket insulation, such as that manufactured and sold by Aspen Aerogels, Inc., Northborough, Mass. USA. In some exemplary embodiments, high-performance insulation material 130 is sealed within a sealed "baggie" or "pouch" made from an encapsulation element 132, which in the illustrated embodiment is a PTFE film 132, which is sealed at a seal 134 around its edge. PTFE film 132 includes two sheets sealed together at seal 134.

With regard to the embodiments illustrated and described in connection with FIGS. 1A-1C, 2A, 2B, 3, 4A, and 4C, high-performance insulation material 120, 120A, 130 can be nominally approximately 10 mm thick. Also, PTFE film 124, 124-1, 132 can be 0.0005 to 0.0500 inch thick. It will be understood that other thicknesses can be selected based on the application to which the insulation is applied.

Also, with regard to the embodiments illustrated and described in connection with FIGS. 1A-1C, 2A, 2B, 3, 4A, and 4C, the PTFE films are sealed to complete the encapsulation by any of various techniques. For example, conventional heat sealing or laser welding can be used to create the seal.

Figure 5:
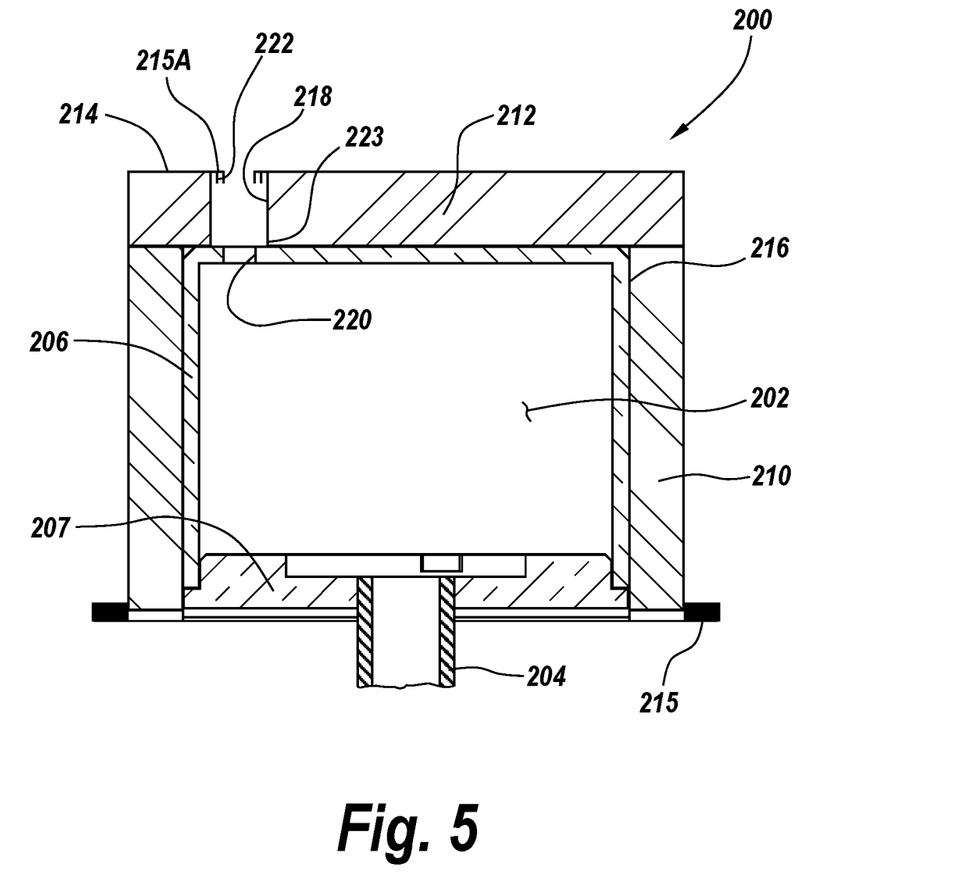
FIG. 5 includes a schematic cross-sectional view of another high-temperature pressure sensor with thermal insulation, according to some exemplary embodiments.
Figure 6A:
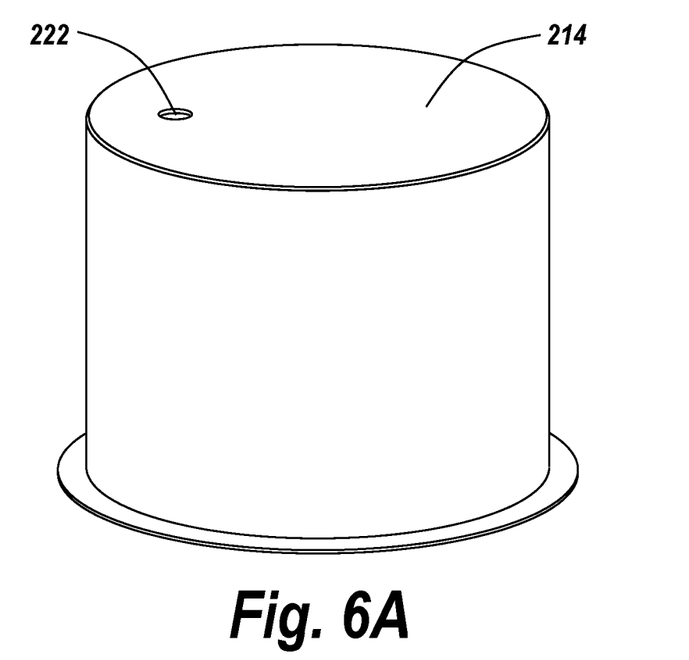
FIG. 6A includes a schematic perspective view of an outer encapsulating element of an encapsulated insulation structure in the high-temperature pressure sensor of FIG. 5, according to some exemplary embodiments.
Figure 6B:
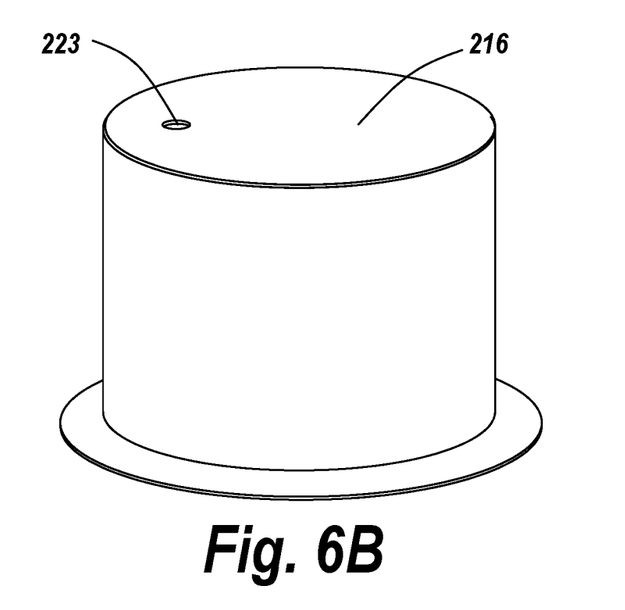
FIG. 6B includes a schematic perspective view of an inner element of an encapsulated insulation structure in the high-temperature pressure sensor of FIG. 5, according to some exemplary embodiments.

FIG. 5 includes a schematic cross-sectional view of another high-temperature pressure sensor 200 with thermal insulation, according to some exemplary embodiments. FIG. 6A includes a schematic perspective view of a first outer encapsulating element 214 of an encapsulated insulation structure in the high-temperature pressure sensor of FIG. 5, according to some exemplary embodiments. FIG. 6B includes a schematic perspective view of a second inner encapsulating element 216 of an encapsulated insulation structure in the high-temperature pressure sensor of FIG. 5, according to some exemplary embodiments. In the embodiments of FIGS. 5, 6A and 6B, the encapsulating structure includes the two encapsulating elements 214 and 216 having a "top-hat" shape, as shown, with the second inner encapsulating element 216 being disposed substantially within the first outer encapsulating element 214.

Referring to FIGS. 5, 6A and 6B, high-temperature pressure sensor 200 includes a pressure sensor device 202 at least partially surrounded by a heater shell body 206 attached to heater shell bottom 207 for providing heat to pressure sensor device 202. Inlet tube 204 couples sensor 200 to a space, the pressure of which is being sensed (not shown). Under normal operating conditions heater shell body 206 and heater shell bottom can heat sensor device 202 to temperatures as high as 250° C. or higher. To mitigate the effects of this heating, sensor device 202, heater shell body 206 and heater shell bottom 207 are thermally insulated, according to the present disclosure.

In the exemplary embodiments illustrated in FIGS. 5, 6A and 6B, the thermal insulation includes an encapsulated substantially cylindrical insulation structure 210, sealed at its top to a top encapsulated insulation disk structure 212, both of which are made of one of the high-performance materials described above, i.e., aerogels, microporous silica, and pyrogenic (fumed) silica. Specifically, according to the disclosure, in the exemplary embodiments of FIGS. 5, 6A and 6B, thermal insulation structure 210 and top encapsulated insulation disk structure 212 are made of a rigid material, without the flexibility of the "baggie" or "pouch" of the embodiments described above. For example, the material can be Promalight® thermal insulation, manufactured and sold by Promat, Inc., in Maryville, Tenn. USA.

In sensor 200 of FIGS. 5, 6A and 6B, it may be desirable to provide access to the interior of the structure, such as for wire egress. To that end, heater shell body 206, second inner encapsulating element 216, top encapsulated insulation disk structure 212, and first outer encapsulating element 214 include openings, apertures, holes or perforations 220, 223, 218 and 222, respectively. Opening 218 can be a chimney formed integrally with or fixedly attached to second inner encapsulating element 216 to extend up to and contact with first outer encapsulating element 214. First outer encapsulating element 214 and second inner encapsulating element 216 are heat sealed at every egress to completely seal all particles.

Thermal insulation structure 210 and top encapsulated insulation disk structure 212 are encapsulated in a thin, high-temperature material of which first and second encapsulating elements 214 and 216, respectively, are made. The material can be, for example, a fluoropolymer and/or thermoplastic film, comprising one or more of the following materials: polytetrafluoroethylene (PTFE), perfluoroalkoxy (PFA), ethylene tetrafluoroethylene (ETFE), polyfluoroethylenepropylene (FEP), tetrafluoroethylene/hexafluoropropylene/vinylidene fluoride (THV), polyvinylidene fluoride (PVDF), ethylenechlorotrifluoroethylene (ECTFE), polyether ether ketone (PEEK), polyimide (PI), polyethylenimine (PEI), or other such materials. In some exemplary embodiments, the encapsulation film can have a thickness in the range of 0.0005 to 0.0500 inch.

In the exemplary embodiments illustrated in FIGS. 5, 6A and 6B, first and second encapsulating elements 214 and 216 are made of PFA or FEP, such that the insulation structure can be PFA or FEP encapsulation over Promalight® thermal insulation. First and second encapsulating elements 214 and 216 can be thermoformed, such as by vacuum molding, matched die forming, pressure molding, or blow molding. First and second encapsulating elements 214 and 216 can be sealed together with thermal insulation structure 210 and top encapsulated insulation disk structure 212 captured between them such as by heat sealing or laser welding to form seal 215, thus encapsulating thermal insulation structure 210 and top encapsulated insulation disk structure 212. In addition, chimney/opening 218 of second inner encapsulating element 216 can be sealed to second outer encapsulating element 214 to form seal 215A, such as by heat sealing or laser welding.

As noted above, gas trapped in the encapsulation will expand when heated. If the encapsulation is well sealed to prevent particulate loss, the expanding gas, e.g., air, will be trapped, causing the encapsulation to balloon and/or possibly rupture. According to some exemplary embodiments, this can be addressed by venting the encapsulating elements to the external environment to equalize pressure between the interior and exterior of the elements. In some embodiments, this is accomplished by making the encapsulating elements porous, or by including a porous region or portion of the encapsulating elements, or by laser drilling holes through the encapsulating elements. This will allow gas migration in and out of the encapsulated volume without particle loss. It is known that the particles released from the high-performance insulation material inside the encapsulated volume can be as small as 0.7 µm across. Therefore, in some exemplary embodiments, openings including pores and laser drilled holes are sized to prevent these particles from escaping the interior of the volume through the encapsulating elements. In some particular exemplary embodiments, the openings, i.e., pores and laser drilled holes, are less than or equal to 0.5 µm across.

Figure 7:
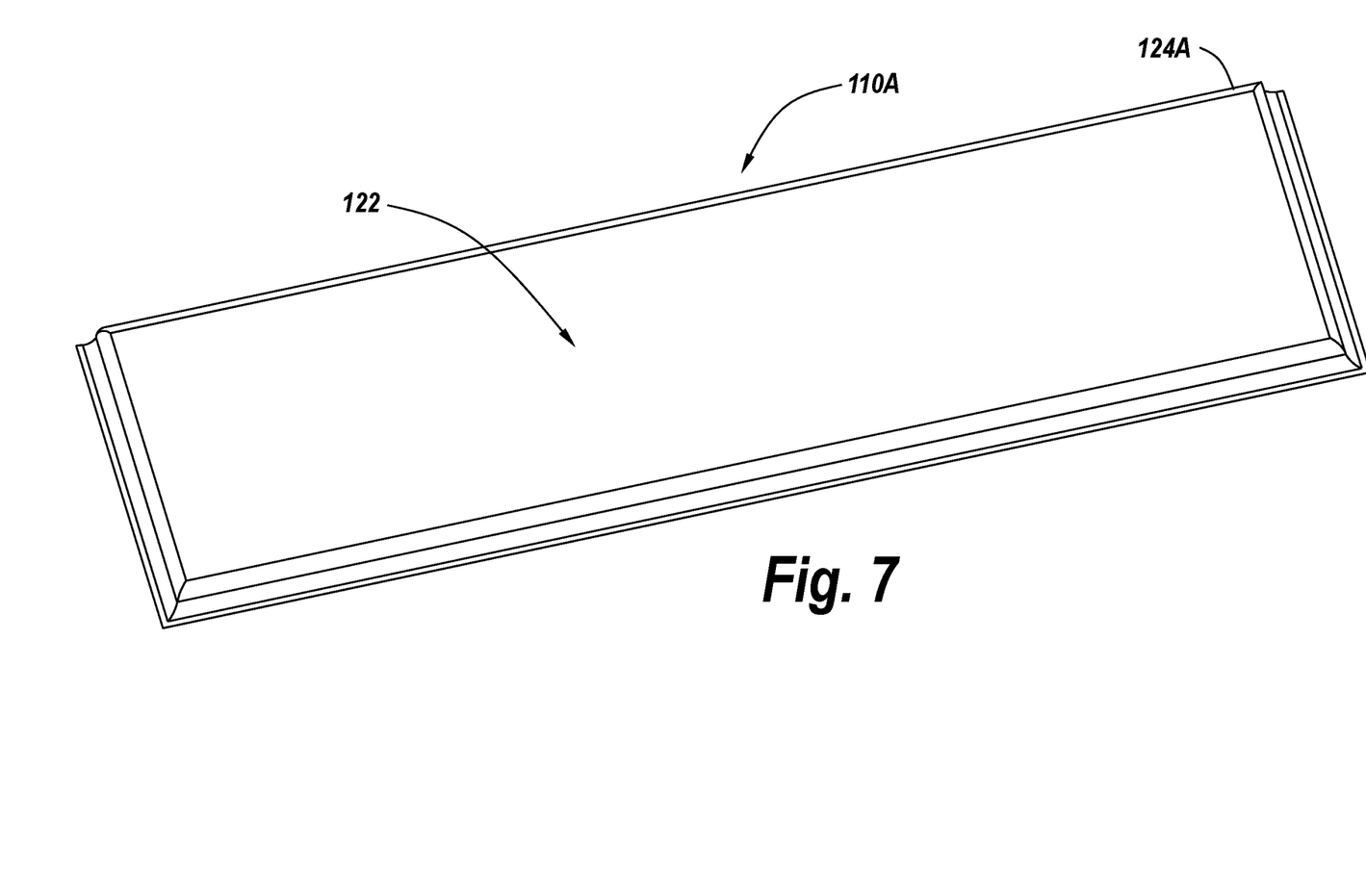
FIG. 7 includes a schematic perspective view of a vented encapsulated insulation structure, which can be used with the high-temperature pressure sensor of FIGS. 1A-1C, according to some exemplary embodiments.

FIG. 7 includes a schematic perspective view of an at least partially porous vented encapsulated insulation structure 110A, which can be used with high-temperature pressure sensor 100, according to some exemplary embodiments. Encapsulated insulation structure 110A is a modification of encapsulated insulation structure 110 described above, modified to provide venting to the exterior of structure 110A. Encapsulated insulation structure 110A includes high-performance insulation material 122 encapsulated within encapsulation element 124A. In the illustrated exemplary embodiment, encapsulation element 124A is a porous film with pores as described above to allow air to travel in and out of encapsulated insulation structure 110A, while not allowing insulation particulates to contaminate externally. In some exemplary embodiments, the material of which encapsulation element 124A is made can be a porous polymer film, such as those manufactured and sold by Porex Corporation of Rairburn, Ga. USA.

Figure 8A:
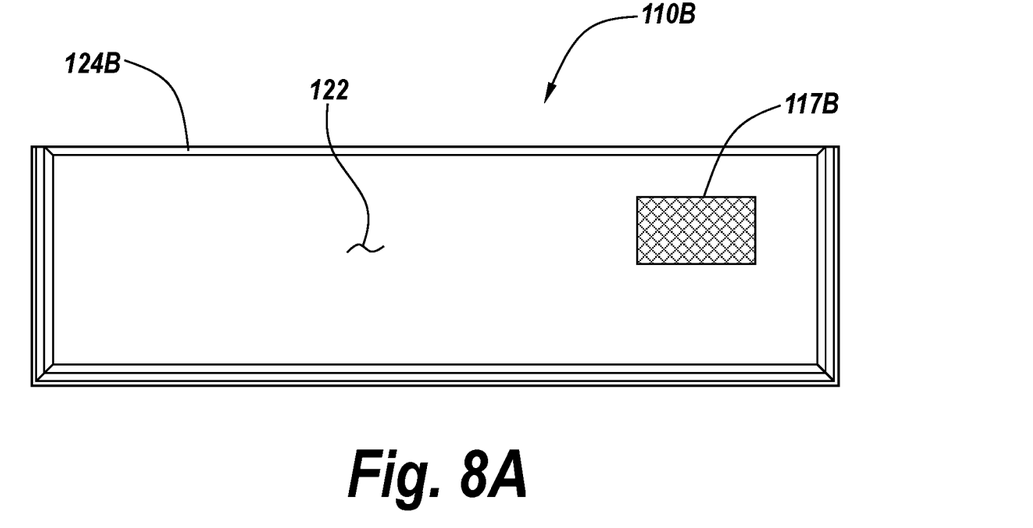
FIG. 8A includes a schematic top view of another vented encapsulated insulation structure, which can be used with the high-temperature pressure sensor of FIGS. 1A-1C, according to some exemplary embodiments.

FIG. 8A includes a schematic top view of another at least partially porous vented encapsulated insulation structure 110B, which can be used with high-temperature pressure sensor 100, according to some exemplary embodiments. Encapsulated insulation structure 110B is a modification of encapsulated insulation structure 110 described above, modified to provide venting to the exterior of structure 110B. The encapsulated insulation structure 110B FIG. 8A is the same as that of FIG. 7, except that only a portion or region 117B of encapsulation element 124B is porous. As in the embodiment of FIG. 7, porous region 117B is a porous film with pores as described above to allow air to travel in and out of encapsulated insulation structure 110B, while not allowing insulation particulates to contaminate externally. In some exemplary embodiments, the material of which porous region 117B of encapsulation element 124B is made can be a porous polymer film, such as porous PTFE, such as those manufactured and sold by Porex Corporation of Rairburn, Ga. USA.

Figure 8B:
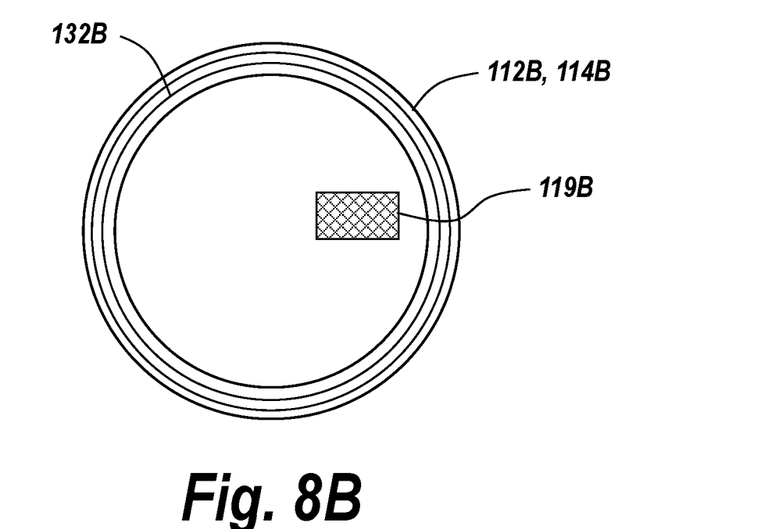
FIG. 8B includes a schematic top view of another vented encapsulated insulation structure, which can be used with the high-temperature pressure sensor of FIGS. 1A-1C, according to some exemplary embodiments.

FIG. 8B includes a schematic top view of another at least partially porous vented encapsulated insulation disk structure 112B, 114B, which can be used with high-temperature pressure sensor 100, according to some exemplary embodiments. Encapsulated insulation disk structure 112B, 114B is a modification of encapsulated insulation disk structure 112, 114 described above, modified to provide venting to the exterior of structure 112B, 114B. Referring to FIG. 8B, a portion or region 119B of encapsulation element 132B is porous. As in the embodiment of FIG. 7, porous region 119B is a porous film with pores as described above to allow air to travel in and out of encapsulated insulation disk structure 112B, 114B, while not allowing insulation particulates to contaminate externally. In some exemplary embodiments, the material of which porous region 119B of encapsulation element 132B is made can be a porous polymer film, such as porous PTFE, such as those manufactured and sold by Porex Corporation of Rairburn, Ga. USA.

Figure 9A:
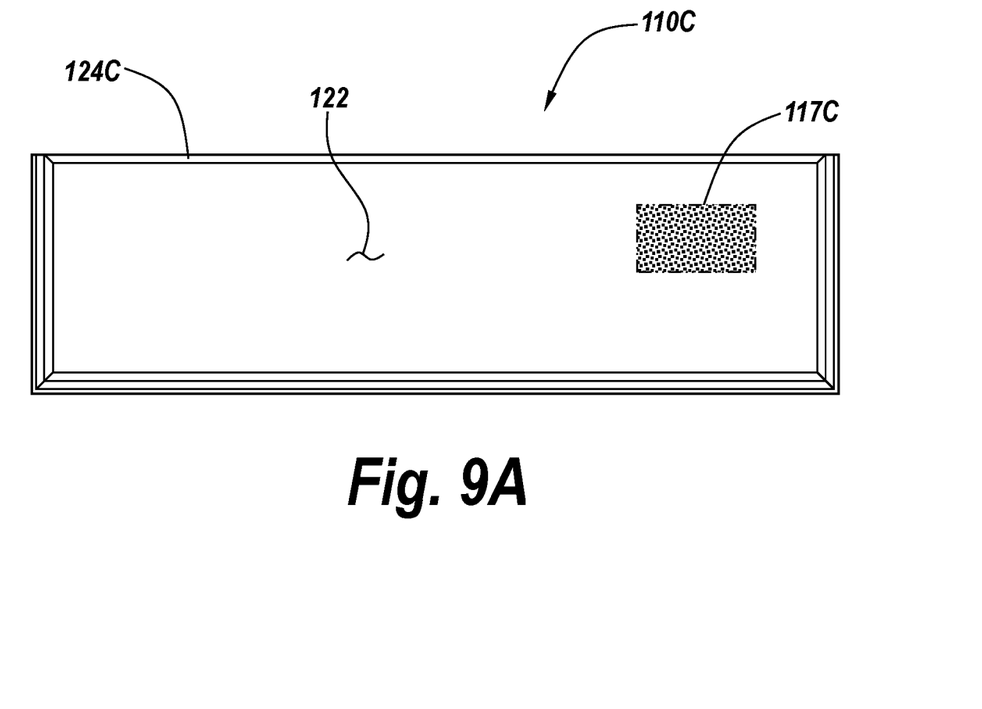
FIG. 9A includes a schematic top view of another vented encapsulated insulation structure, which can be used with the high-temperature pressure sensor of FIGS. 1A-1C, according to some exemplary embodiments.

FIG. 9A includes a schematic top view of another vented encapsulated insulation structure 110C, which can be used with high-temperature pressure sensor 100, according to some exemplary embodiments. Encapsulated insulation structure 110C is a modification of encapsulated insulation structure 110 described above, modified to provide venting to the exterior of structure 110C. Encapsulated insulation structure 110C of FIG. 9A is the same as that of FIG. 8A, except portion region 117C of encapsulation element 124C is vented by a plurality of laser drilled holes, instead of being made of a porous polymer material. It should also be understood that, alternatively, the entire encapsulation element 124C can be perforated or laser drilled, that is, portion or region 117C can extend over the entire surface of encapsulation element 124C.

Figure 9B:
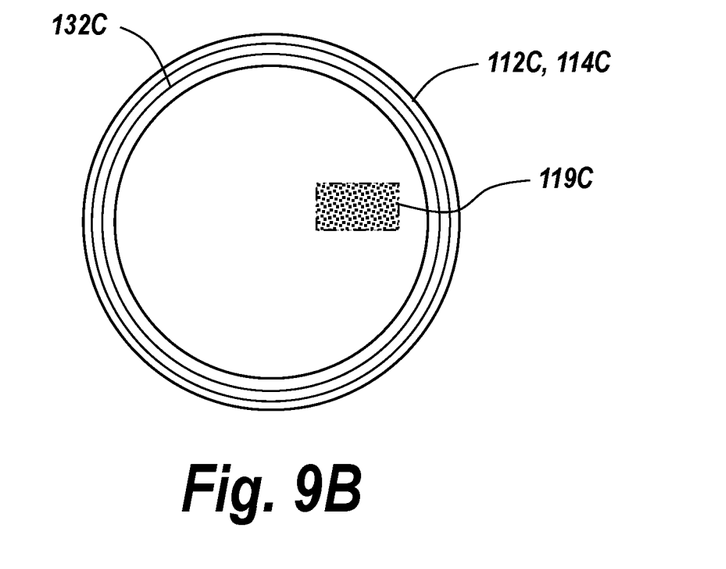
FIG. 9B includes a schematic top view of another vented encapsulated insulation structure, which can be used with the high-temperature pressure sensor of FIGS. 1A-1C, according to some exemplary embodiments.

FIG. 9B includes a schematic top view of another vented encapsulated insulation disk structure 112C, 114C, which can be used with high-temperature pressure sensor 100, according to some exemplary embodiments. Encapsulated insulation disk structure 112C, 114C is a modification of encapsulated insulation disk structure 112, 114 described above, modified to provide venting to the exterior of structure 112C, 114C. Encapsulated insulation disk structure 110C of FIG. 9B is the same as that of FIG. 8B, except portion or region 119C of encapsulation element 132C is vented by a plurality of laser drilled holes, instead of being made of a porous polymer material. It should also be understood that, alternatively, the entire encapsulation element 132C can be perforated or laser drilled, that is, portion or region 119C can extend over the entire surface of encapsulation element 124C.

Figure 10A:
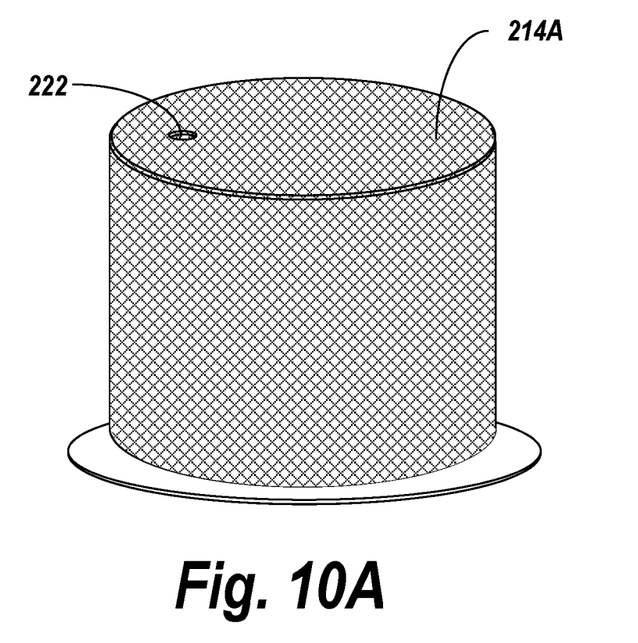
FIG. 10A includes a schematic perspective view of first outer encapsulating element at least partially made of porous material, which can be used with the high-temperature pressure sensor of FIG. 5, according to some exemplary embodiments.
Figure 10B:
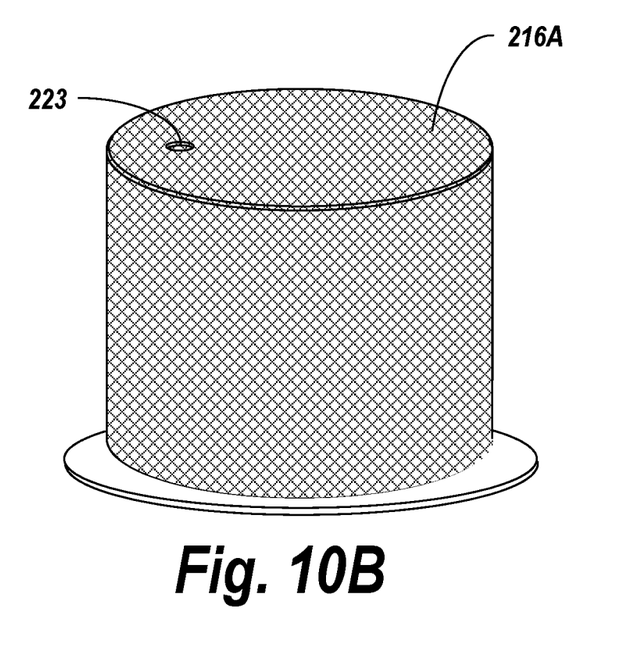
FIG. 10B includes a schematic perspective view of second inner encapsulating element at least partially made of porous material, which can be used with the high-temperature pressure sensor of FIG. 5, according to some exemplary embodiments.
Figure 11A:
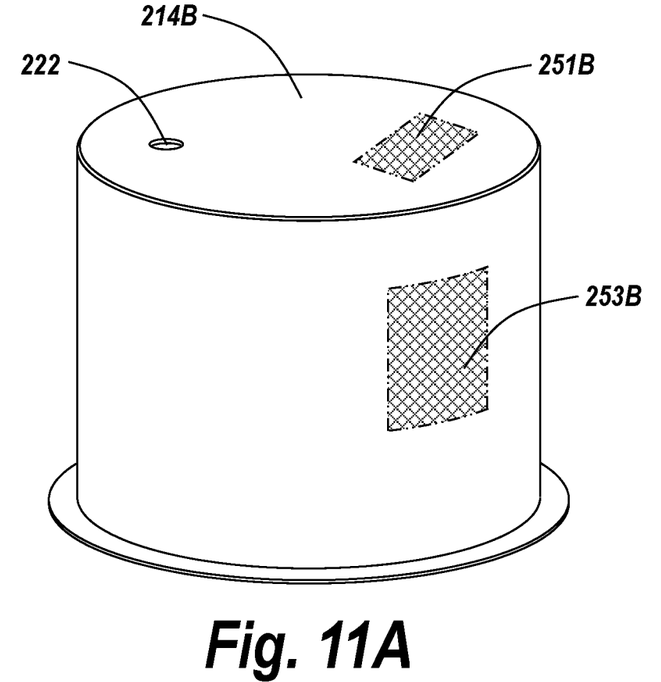
FIG. 11A includes a schematic perspective view of first outer encapsulating element having one or more venting regions at least partially made of porous material, which can be used with the high-temperature pressure sensor of FIG. 5, according to some exemplary embodiments.
Figure 11B:
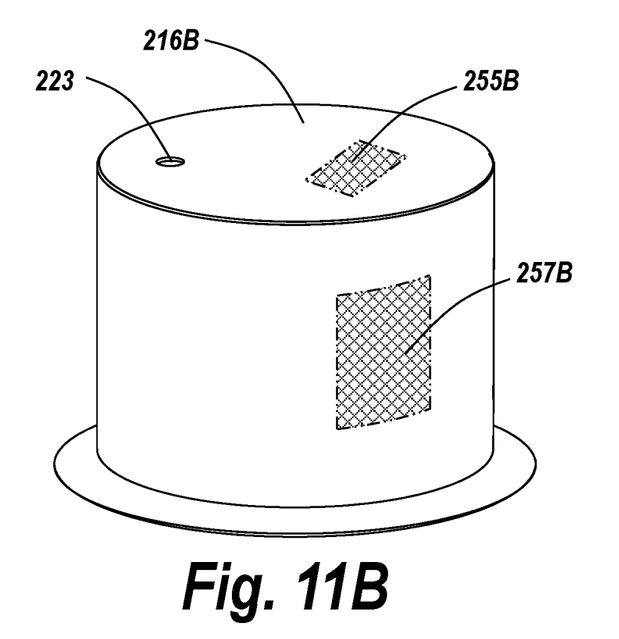
FIG. 11B includes a schematic perspective view of second inner encapsulating element, having one or more venting regions at least partially made of porous material, which can be used with the high-temperature pressure sensor of FIG. 5, according to some exemplary embodiments.
Figure 12A:
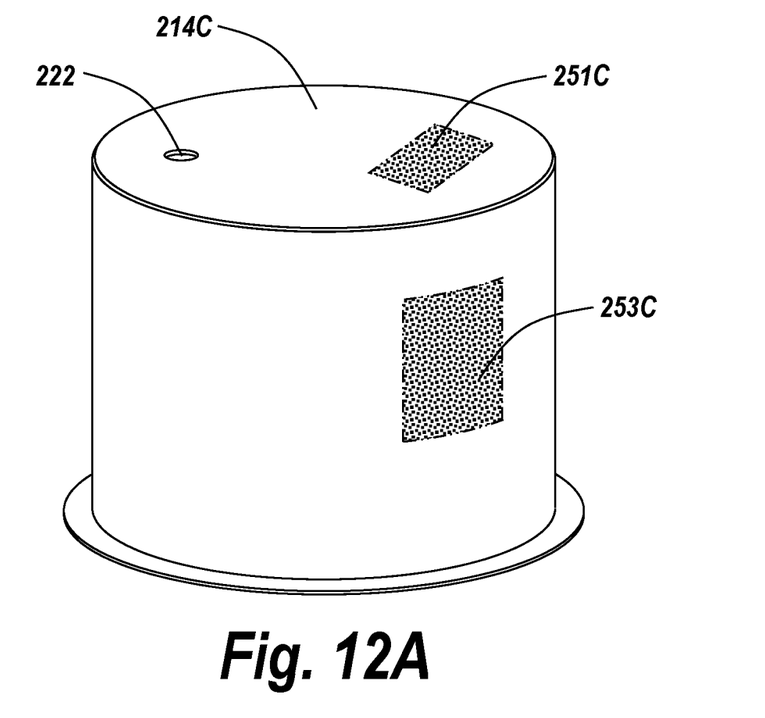
FIG. 12A includes a schematic perspective view of first outer encapsulating element having one or more venting regions, each including a plurality of laser drilled holes, which can be used with the high-temperature pressure sensor of FIG. 5, according to some exemplary embodiments.
Figure 12B:
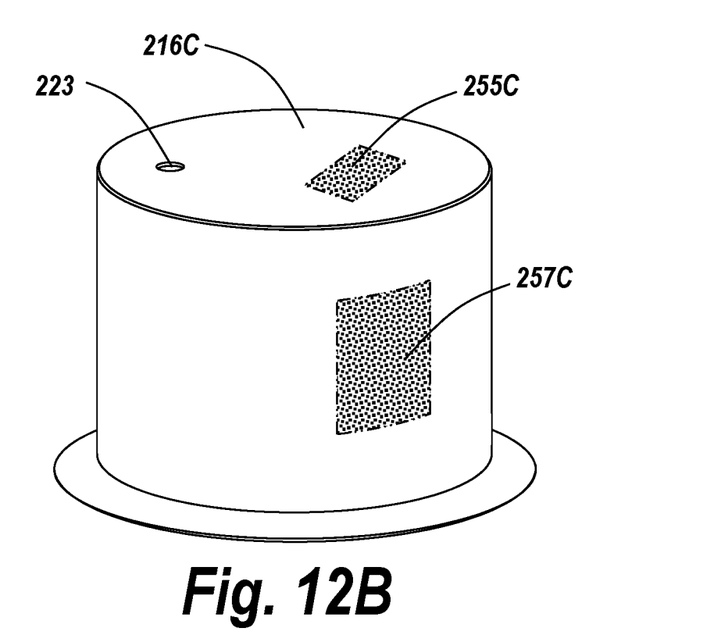
FIG. 12B includes a schematic perspective view of second inner encapsulating element 216C, having one or more venting regions, each including a plurality of laser drilled holes, which can be used with the high-temperature pressure sensor of FIG. 5, according to some exemplary embodiments.

The encapsulated insulation structure of sensor 200 can also be vented in a fashion analogous to the venting of sensor 100 described above. In the case of sensor 200, one or both of first outer encapsulating element 214 (FIG. 6A) and second inner encapsulating element 216 (FIG. 6B) can be configured with venting capabilities similar to those described above, with the same venting pore or hole size features to block passage of particulates while allowing air to pass, as described above. Specifically, FIG. 10A includes a schematic perspective view of first outer encapsulating element 214A at least partially made of porous material, which can be used with high-temperature pressure sensor 200, according to some exemplary embodiments. FIG. 10B includes a schematic perspective view of second inner encapsulating element 216A at least partially made of porous material, which can be used with high-temperature pressure sensor 200, according to some exemplary embodiments. FIG. 11A includes a schematic perspective view of first outer encapsulating element 214B having one or more venting regions 251B, 253B, at least partially made of porous material, which can be used with high-temperature pressure sensor 200, according to some exemplary embodiments. FIG. 11B includes a schematic perspective view of second inner encapsulating element 216B, having one or more venting regions 255B, 257B, at least partially made of porous material, which can be used with high-temperature pressure sensor 200, according to some exemplary embodiments. FIG. 12A includes a schematic perspective view of first outer encapsulating element 214C having one or more venting regions 251C, 253C, each including a plurality of laser drilled holes, which can be used with high-temperature pressure sensor 200, according to some exemplary embodiments. FIG. 12B includes a schematic perspective view of second inner encapsulating element 216C, having one or more venting regions 255° C., 257° C., each including a plurality of laser drilled holes, which can be used with high-temperature pressure sensor 200, according to some exemplary embodiments. The porous materials can be made of a porous polymer film, such as porous PTFE, such as those manufactured and sold by Porex Corporation of Rairburn, Ga. USA.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A high-temperature pressure sensor, comprising:
a pressure sensor device;
a heater shell body external to the pressure sensor device for providing heat to the pressure sensor device;
a particle-generating insulation material; and
an encapsulation material encapsulating the particle-generating insulation material to form an encapsulated insulation structure comprising the particle-generating insulation material within the encapsulation material, such that the encapsulation material contains particles generated by the particle-generating insulation material within encapsulated insulation structure, the encapsulated insulation structure being disposed adjacent to an exterior of the heater shell body.

2. The pressure sensor of claim 1, wherein the particle-generating insulation material comprises one of aerogel material, microporous silica, and pyrogenic (fumed) silica.

3. The pressure sensor of claim 1, wherein the encapsulation material comprises a fluoropolymer material.

4. The pressure sensor of claim 1, wherein the encapsulation material comprises a thermoplastic material.

5. The pressure sensor of claim 4, wherein the thermoplastic material is a thermoplastic film.

6. The pressure sensor of claim 4, wherein the thermoplastic material comprises at least one material selected from polytetrafluoroethylene (PTFE), perfluoroalkoxy (PFA), ethylene tetrafluoroethylene (ETFE), polyfluoroethylenepropylene (FEP), tetrafluoroethylene/hexafluoropropylene/vinylidene fluoride (THV), polyvinylidene fluoride (PVDF), ethylenechlorotrifluoroethylene (ECTFE), polyether ether ketone (PEEK), polyimide (PI) and polyethylenimine (PEI).

7. The pressure sensor of claim 4, wherein the thermoplastic material has a thickness in the range of 0.0005 to 0.0500 inch.

8. The pressure sensor of claim 1, wherein the encapsulation material comprises a metallized film.

9. The pressure sensor of claim 1, wherein the encapsulation material is in sheet form.

10. The pressure sensor of claim 1, wherein the encapsulation material is in vacuum-molded form.

11. The pressure sensor of claim 1, wherein the encapsulation material is in pressure-molded form.

12. The pressure sensor of claim 1, wherein the encapsulation material is in matched die molded form.

13. The pressure sensor of claim 1, wherein the encapsulation material is in blow-molded form.

14. The pressure sensor of claim 1, wherein the encapsulation material comprises a heat seal for sealing the particle-generating insulation material within the encapsulation material.

15. The pressure sensor of claim 1, wherein the encapsulation material comprises a laser weld for sealing the particle-generating insulation material within the encapsulation material.

16. The pressure sensor of claim 1, wherein the encapsulation material comprises an adhesive bond for sealing the particle-generating insulation material within the encapsulation material.

17. The pressure sensor of claim 1, wherein the encapsulation material comprises a tape seal for sealing the particle-generating insulation material within the encapsulation material.

18. The pressure sensor of claim 1, wherein the encapsulation material comprises a seal such that the particle-generating insulation material is sealed within the encapsulation material, and wherein an interior of the encapsulation material is at least partially evacuated.

19. The pressure sensor of claim 18, wherein the encapsulation material comprises a one-way valve for facilitating at least partial evacuation of the interior of the encapsulation material.

20. The pressure sensor of claim 18, wherein the one-way valve is adapted to facilitate the at least partial evacuation of the interior of the encapsulation material by vacuum pumping.

21. The pressure sensor of claim 18, wherein the one-way valve is adapted to facilitate the at least partial evacuation of the interior of the encapsulation material by heating of the porous insulation material and adjacent gas.

22. The pressure sensor of claim 1, wherein the encapsulation material comprises a porous region allowing gas migration in and out of an interior of the encapsulation material, the porous region having openings having a size selected to contain particles generated by the particle-generating insulation within the encapsulation material.

23. The pressure sensor of claim 22, wherein the porous region comprises a porous membrane.

24. The pressure sensor of claim 22, wherein the porous region comprises one or more laser-drilled holes.

25. A method of making a high-temperature pressure sensor, comprising:
providing a heater shell body external to a pressure sensor device for providing heat to the pressure sensor device;
encapsulating a particle-generating insulation material within an encapsulation material to form an encapsulated insulation structure comprising the particle-generating insulation material within the encapsulation material, such that the encapsulation material contains particles generated by the particle-generating insulation material within encapsulated insulation structure; and
disposing the encapsulated insulation structure adjacent to an exterior of the heater shell body.

26. The method of claim 25, wherein the particle-generating insulation material comprises one of aerogel material, microporous silica, and pyrogenic (fumed) silica.

27. The method of claim 25, wherein the encapsulation material comprises a fluoropolymer material.

28. The method of claim 25, wherein the encapsulation material comprises a thermoplastic material.

29. The method of claim 28, wherein the thermoplastic material is a thermoplastic film.

30. The method of claim 28, wherein the thermoplastic material comprises at least one material selected from polytetrafluoroethylene (PTFE), perfluoroalkoxy (PFA), ethylene tetrafluoroethylene (ETFE), polyfluoroethylenepropylene (FEP), tetrafluoroethylene/hexafluoropropylene/vinylidene fluoride (THV), polyvinylidene fluoride (PVDF), ethylenechlorotrifluoroethylene (ECTFE), polyether ether ketone (PEEK), polyimide (PI) and polyethylenimine (PEI).

31. The method of claim 28, wherein the thermoplastic material has a thickness in the range of 0.0005 to 0.0500 inch.

32. The method of claim 25, wherein the encapsulation material comprises a metallized film.

33. The method of claim 25, wherein the encapsulation material is in sheet form.

34. The method of claim 25, wherein the encapsulation material is in vacuum-molded form.

35. The method of claim 25, wherein the encapsulation material is in pressure-molded form.

36. The method of claim 25, wherein the encapsulation material is in matched die molded form.

37. The method of claim 25, wherein the encapsulation material is in blow-molded form.

38. The method of claim 25, further comprising heat sealing the encapsulation material to seal the porous insulation material within the encapsulation material.

39. The method of claim 25, further comprising laser welding the encapsulation material to seal the particle-generating insulation material within the encapsulation material.

40. The method of claim 25, further comprising adhesively bonding the encapsulation material to seal the particle-generating insulation material within the encapsulation material.

41. The method of claim 25, further comprising applying a tape to the encapsulation material to seal the particle-generating insulation material within the encapsulation material.

42. The method of claim 25, further comprising:
sealing the particle-generating insulation material within the encapsulation material; and
at least partially evacuating an interior of the encapsulation material.

43. The method of claim 42, wherein the encapsulation material comprises a one-way valve for facilitating at least partially evacuating the interior of the encapsulation material.

44. The method of claim 42, wherein at least partially evacuating the interior of the encapsulation material comprises vacuum pumping the interior of the encapsulation material via the one-way valve.

45. The method of claim 42, wherein at least partially evacuating the interior of the encapsulation material comprises heating the particle-generating insulation material and adjacent gas.

46. The method of claim 25, further comprising forming a porous region in the encapsulation material to allow gas migration in and out of an interior of the encapsulation material, the porous region having openings having a size selected to contain particles generated by the particle-generating insulation within the encapsulation material.

47. The method of claim 46, wherein forming the porous region in the encapsulation material comprises forming the encapsulation material with a porous membrane.

48. The method of claim 46, wherein forming the porous region in the encapsulation material comprises laser-drilling a plurality of holes in the encapsulation material.

49. The method of claim 25, further comprising forming an opening in the encapsulation material to allow gas migration in and out of an interior of the encapsulation material.

* * * * *